Patented June 26, 1934

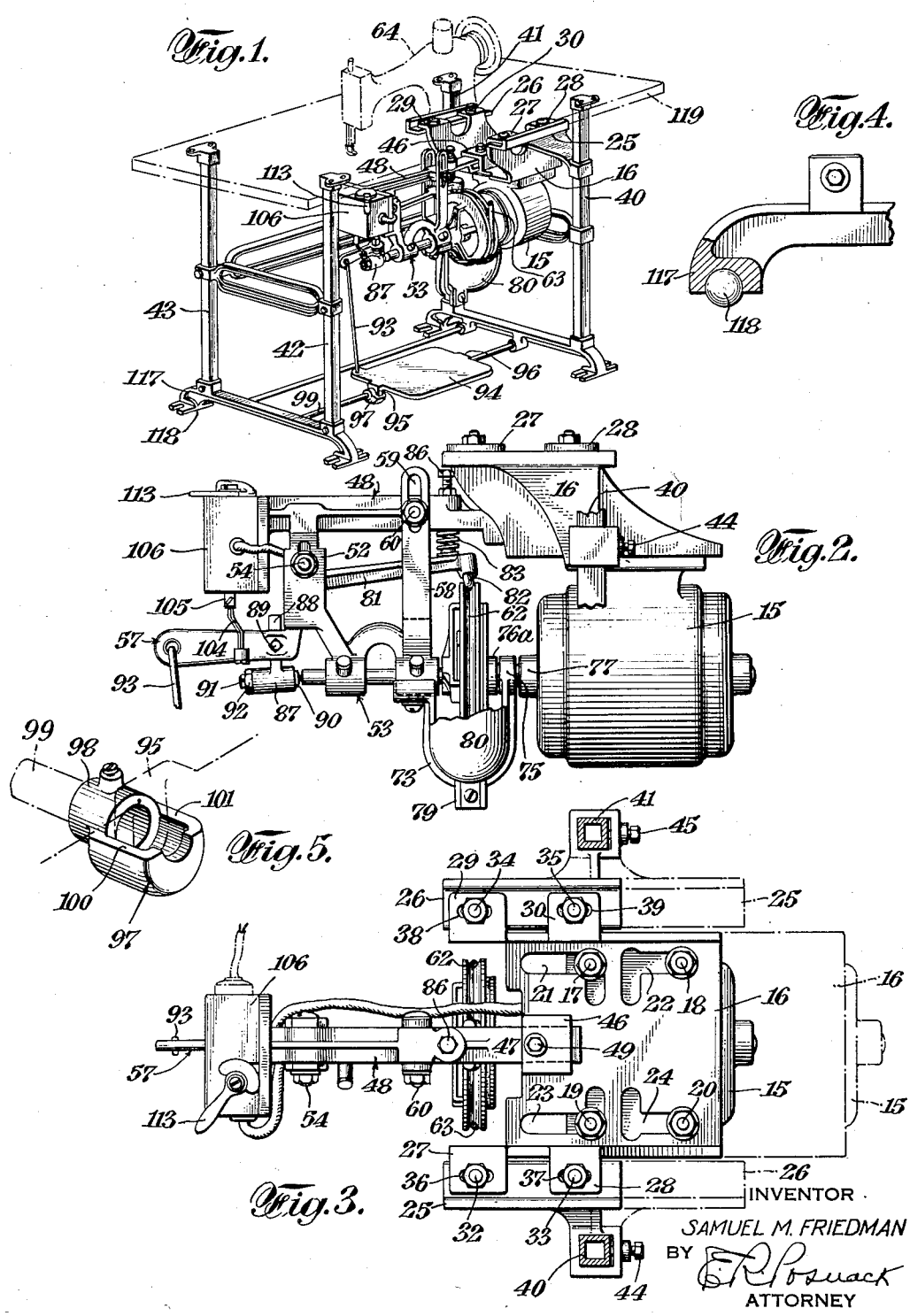

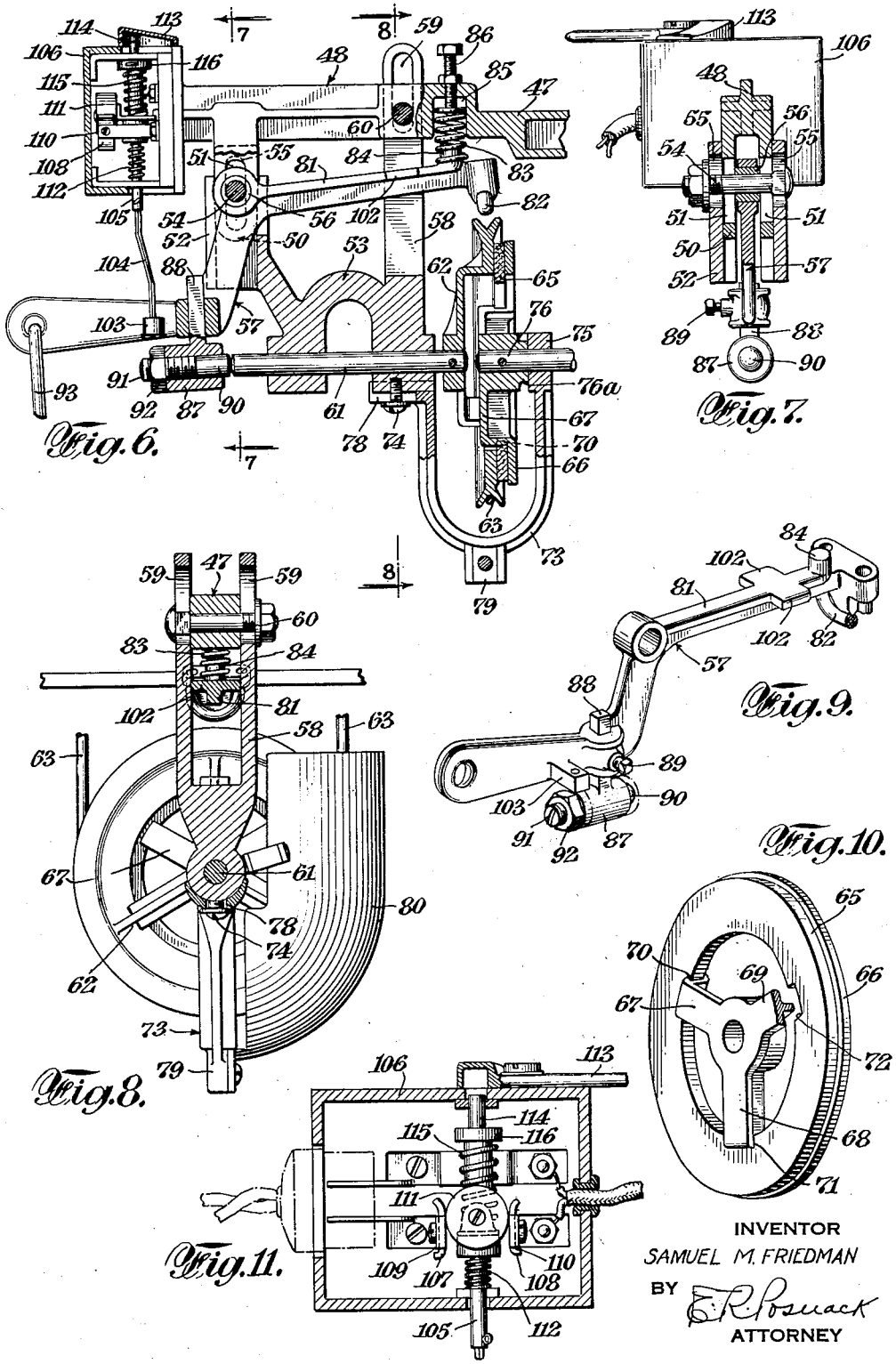

1,964,459

UNITED STATES PATENT OFFICE 1,964,459

TRANSMISSION MECHANISM AND ADJUSTABLE MOUNTING THEREFOR

Samuel M. Friedman, Brooklyn, N. Y.

Application March 2, 1933, Serial No. 659,327

11 Claims. (Cl. 192—.02)

This invention relates to transmission mechanisms and adjustable mountings therefor, particularly of the type disclosed in my Letters Patent for Transmission mechanism issued March 1, 1932, No. 1,847,645, on which this invention is an improvement.

One of the main objects of this invention is to enable a transmission mechanism of this class to be so adjustably mounted on a support, that the constituent parts thereof can be readily and securely positioned into cooperable relationship with variously sized motors, pulleys and machine-supporting tables. Another object of my invention is to present a clutch and facing combination of simple construction and easily assembled without the use of mucilaginous or extraneous fastening means. A further object is to permit a fixed and stationary structural element to take up the thrust from the motor bearings and thereby relieve the clutch and pulley from any resulting undesirable lateral forces. Still another object is to allow an unrestricted pivotal rotation of the switch-pulley-brake lever, and at the same time to prevent any side play thereof. Further objects, among others, are to provide easily attached and firmly secured rubber cushions for the legs of the structure; to present a combination treadle stop for both limiting the angular movement of the treadle and preventing a lateral shift thereof; to enable ready replacement of an attached machine operated by the transmission mechanism with another machine without disturbing or detaching the elements of the assembly of motor, transmission mechanism and mounting; to provide a motor switch secured to the structure with readily demountable contact elements; and to enable the entire device to be taken apart into units convenient for shipping.

Other objects, features and advantages will appear from the drawings and the description hereinafter given.

Referring to the drawings,

Figure 1 is a perspective showing the assembled arrangement of the constituent parts of my invention as applied to a sewing machine and supporting table therefor.

Figure 2 is a side view of the transmission mechanism and the major portion of the adjustable mounting therefor.

Figure 3 is a plan view of Figure 2, showing, in dot-dash lines, the reversed positions of the post brackets.

Figure 4 is a fragmentary section of a leg of the supporting frame work showing the rubber ball cushioning arrangement.

Figure 5 is a perspective view of the treadle stop showing by dot-dash lines the relative position of the associated parts.

Figure 6 is a fragmentary side sectional view of this device, illustrating the general arrangement and construction of the transmission mechanism, switch, and portions of the adjustable mounting.

Figure 7 is a vertical section of Figure 6 taken along line 7—7.

Figure 8 is a vertical section of Figure 6 taken along line 8—8.

Figure 9 is a perspective of the switch-clutch-brake control lever.

Figure 10 illustrates the assembly of clutch disc and clutch facing, and

Figure 11 is an internal front view of the switch mechanism.

In the drawings, the motor 15 is shown attached to the motor base 16 by the bolts 17, 18, 19 and 20 in engagement with slots 21, 22, 23 and 24 thereof, respectively. The post brackets 25 and 26 are fastened to the motor base by attachment thereof to the lugs 27, 28, 29 and 30 of the said base, the bolts 32, 33, 34 and 35, which effect the attachment, being engageable with the lug slots 36, 37, 38 and 39. The said brackets 25 and 26 are slidably mounted over the posts 40 and 41 respectively, the other two posts of the supporting framework being designated by the numerals 42 and 43. The screws 44 and 45 are operatively engageable with the posts 40 and 41 and the respective post brackets.

In slidable engagement with the hollow lug 46 of the motor base 16 is the portion 47 of the supporting arm 48, the bolt 49 being adaptable to hold said arm fixed in a predetermined position with respect to the said base. Depending from the said arm 48 is the bifurcated member 50 having the two slotted apertures 51 therein. The upwardly extending bifurcated portion 52 of the hanger 53 is in slidable engagement with the two outer lateral surfaces of the said bifurcated portion 50, and is adjustably secured thereto by the bolt 54 which extends through the two slots 55 thereof and through both of the slots 51 of the said depending portion 50. Mounted over the shank of the bolt 54 is the bushing 56 over which is rotatably mounted the lever 57.

The said hanger contains another upwardly extending member 58 the upper portion of which is bifurcated and slidably engageable with the arm 48,—the two slots 59 of member 58 accommodating the bolt 60 affixed to member 48 and adjustably engageable with said member 58.

The hanger 53 supports pulley shaft 61 which is in both rotatable and slidable engagement therewith. Attached to the extremity of said shaft 61 is the pulley 62 with the grooved periphery of which the belt 63 is engageable to operate a machine such as 64. The said pulley is operatively engageable with the clutch facing 65, which is in juxtaposition to the clutch disc 66 and mounted over the protruding arms 67, 68 and 69 of the clutch. The said arms extend beyond the plane of the contacting surface of the peripheral clutch disc 66, and the clutch facing 65 is provided with recesses 70, 71 and 72 adapted to accommodate the said arms at their junctures with the disc.

The size of these recesses is such that they will be in frictional engagement with the protruding portions of the arms at said junctures, and will hence be held in place against the clutch disc without the aid of any mucilaginous or fastening means. Inasmuch as the only forces acting upon the clutch facing 65 are such as to tend to press the facing and clutch disc together, and to tend to turn the clutch facing rotatably about the axis of the clutch, the assembly of clutch disc and facing which I have conceived and herein described is entirely practical for the purpose, as it cannot be detached by any operative action of the mechanism and cannot be rotatably moved due to the interlocking arrangement of clutch facing and clutch arms. Furthermore, replacement of a worn out facing obviously becomes a simple matter and can be quickly and readily effected without any trouble.

Attached to the bottom portion of hanger 53 is the stirrup 73, the screw 74 effecting this attachment,—the boss 75 at the other terminal of the stirrup containing a bearing therein which supports the motor shaft 76 and permits rotation therein. The said boss 75 is positioned between and adjacent the hub 76a of the clutch and the bearing 77 of the motor,—and inasmuch as this stirrup is a fixed and stationary element, it will serve to take up any thrust from the motor bearing and hence relieve the clutch and pulley from the action of any resulting undesirable forces. The slot 78 in the stirrup 73 permits of a longitudinal adjustment of this stirrup, and this adjustment can be effected by manipulating the said screw 74. Attached to the lug 79 at the bottom of the stirrup is the belt safety guard 80 which serves as a protective casing about the pulley and clutch.

The lever 57 is essentially similar to that disclosed in my said Patent No. 1,847,645, in which the operation and function thereof is fully set forth. This lever contains the brake arm 81 which has secured thereto the brake strap 82 engageable with the peripheral groove of the pulley,—the helical spring 83 being mounted over the lug 84 and being positioned within the recess 85 of the arm 48 with which the bolt and nut assembly 86 is operatively engageable to vary the tension in the said spring.

Slidably adjustable within the effort arm of the lever is an abutter member containing the pin holder 87, the element 88 thereof extending through an aperture of a lug in said arm and being adjustably affixed thereto by the screw 89. Within this pin holder is the pin 90 which is frictionally set into the central opening in said holder, the exposed end of the pin being engageable with the adjacent extremity of the pulley shaft 61.

The position of the pin 90 within the holder is controlled by the stud 91 over which is mounted the nut 92. When said pin 90 becomes worn, a manipulation of the nut 90 and stud 91 will force the pin outwardly so that an end thereof will protrude sufficiently for operative engagement with said pulley shaft. It will be noted that the said pin holder 87 is reversely adjustable within the lever, so that the surface thereof facing the adjacent extremity of the pulley shaft can be turned about and the opposite surface thereof positioned in facing relation to the end of said shaft,—the pin 90 being likewise reversed therein. Inasmuch as the element 88 is not centrally positioned with respect to said pin holder, the portions thereof on either side of said element are unequal, and hence a reversal of the holder as described and a proper adjustment of the pin 90 within the holder will enable this arrangement to be adaptable to pulleys of different widths.

The brake arm of the lever 57 is provided with wings 102 which are engageable with the inner surfaces of the bifurcated end of member 58, so that although a pivotal movement of the lever is at all times possible, no side play or lateral movement of the said lever can take place due to the abutment of the sides of the wings with said bifurcated portion.

Operatively attached to the lever 57 is the link 93 which is pivotally attached to the treadle 94. The lugs 95 and 96 of the treadle are respectively engageable with the two hollow treadle stops 97 (Figure 5). Each of these stops contains a closed portion 98 through which the tie rod or shaft 99 extends and which it supports, as well as an open portion having horizontal walls 100 and 101. With this arrangement it will be seen that the treadle cannot be shifted longitudinally on the rod 99 due to the lateral retaining walls of said stop. Further, it will be noted that the sides of the lugs come into engagement with said walls 100 and 101, so that the angular movement of the treadle is limited by the abutment of the said sides with these walls.

Associated with the lever 57 is the lug 103 which is operatively connected to the link 104 attached to the contact rod 105 within the switch member 106. The flat contact elements 107 and 108 are removably secured to the spring contact arms 109 and 110 respectively, and the cylindrical contact roller 111 is removably secured by a screw to the contact rod 105. A downward movement of the rod 105, upon a manipulation of the treadle, will bring the lateral side of said roller into operable engagement with the contact elements 107 and 108 to close the circuit through the motor. Upon a release of the treadle, the spring 112 brings the elements out of engagement and opens the circuit. To operate the switch by hand, the lever 113 is rotated, thereby causing a wedge action against the rod 114,—in longitudinal alignment with rod 105 and connected to roller 111, to depress it and yieldably bring said roller into operative engagement with the contacts 107 and 108. Upon a return movement of the said lever 113, the rod 114 will be relieved from the downward pressure, and the spring 115, acting upon the collar 116, will cause the attached roller 111 to move out of engagement with said contact elements. This arrangement not only assures complete and perfect contacting, but also enables ready replacement of worn out contact elements to be made.

Referring to Figure 4 it will be seen that the leg 117 contains a recess therein adapted to receive the rubber ball 118. The arrangement is such that more than one-half of the ball is inserted within the recess in the lug, so that a smaller portion of the ball protrudes than extends inwardly. This insures a very secure attachment of the ball, and makes it impossible for it to become detached except by forceful manipulation. Inasmuch as the ball is made of rubber, it can be forced into position within the recess in the leg due to its yieldability. The cushioning effect of an elastic medium, such as the rubber ball 118, is very desirable for a structure of this kind.

It will be noted that the mounting for the constituent parts of this device is so arranged as to render it readily adaptable to various sizes of motors and pulleys. The hanger 53 is vertically adjustable with reference to the arm 48, so that for motors of different heights, the shaft 61 and the pulley 62 are correspondingly adjustable with relation to the motor shaft 76. For varying lengths of motors, the arm 48 can be moved horizontally due to the slidable engagement of the portion 47 thereof with the motor base, so that the pulley and clutch will correspondingly be moved horizontally to suit. For different widths of pulleys, and for different lengths of pulley shafts, the pin holder 87 is reversably adjustable, as explained, so that the pin 90 and the end of shaft 61 can be cooperatively positioned at all times. The stirrup 73 is movable longitudinally by a manipulation of the screw 74, so that the boss 75 can occupy a predetermined position with reference to the hub 76a and bearing 77. The lever 57 is adjustable vertically within the slots 51, so that the pivotal point thereof can be varied to suit the diameter of the pulley to enable a proper coaction of the brake strap therewith. The abutter member is adjustable with respect to height and length of the motor, by varying the position of the pin holder 87 with relation to the lever 57, and by adjusting the pin 90 longitudinally.

It should be further noted that the pulley is unrestricted in its rotation about its pivotal support, as it swings freely between the bifurcated ends of the depending portion 50 of supporting bar 48. Note should also be taken of the fact that the said bifurcated depending portion 50 serves a double purpose, in that the space therebetween accommodates the lever, and the outer surfaces thereof are adaptable to slidably accommodate the upwardly extending portion 52 of the hanger 53.

In order to either increase or decrease the knee space for the operator or to gain mounting distance, the post brackets 25 and 26 can be reversed, as shown by the dot-dash lines in Figure 3. In this specific illustration, it is apparent that more space becomes available with this reversal arrangement.

The table 119 containing the machine 64 thereon is not secured to any part of the transmission mechanism proper or the motor base, but is mounted upon and suitably secured to the four posts 40, 41, 42 and 43. With this arrangement, should it be desired to replace a machine such as 64, operated by the mechanism, with another machine, all that need be done is to detach the table from the posts and substitute in place thereof a new table with a new machine thereon. It thus becomes apparent that there is no necessity whatsoever of detaching the constituent parts of the transmission mechanism or the mountings therefor, as is the case in most devices where the table equivalent to 119 has secured to the underside thereof the motor or other parts.

Although this entire apparatus presents a compact device thoroughly flexible in its adaptability to variously sized motors, pulleys and different machines, it is so assembled, as becomes apparent from a study of this design, that the constituent parts thereof can be readily detached and the entire device taken apart into units convenient for shipping.

This invention is not limited to the particular form herein disclosed and described, as other mechanical embodiments thereof can be employed within the scope of the appended claims.

What I claim is:—

1. In a transmission mechanism and mounting therefor, a motor base, a motor supported thereby, a supporting arm horizontally adjustable and removably secured to said base, an electric switch mounted on said arm, a hanger secured to said arm for vertical adjustment, a pulley and a shaft therefor supported by said hanger, a clutch keyed to the armature shaft of said motor and operatively engageable with the pulley, a brake operable on said pulley; a lever having thereon means to simultaneously actuate said switch, said brake and the pulley shaft assembly for engagement with the clutch, actuating means operatively connected to said lever, yieldable means operable upon said lever and adjustably secured to said arm; a plurality of vertical posts for supporting the machine with which the transmission mechanism is operatively connected, and means adjustably associated with said posts for supporting said motor base.

2. In a transmission mechanism and mounting therefor, a motor base, a motor supported thereby, a plurality of vertical posts for supporting the machine operated by the transmission mechanism, means adjustably associated with said posts for supporting said motor base at various predetermined levels, a pulley and a shaft therefor, a clutch keyed to the motor shaft of said motor and operatively engageable with the pulley, a brake operable on said pulley, an electric switch; a lever having thereon means to simultaneously actuate said switch, said brake and the pulley shaft assembly for engagement with the clutch, the pivotal point of said lever being slidably adjustable horizontally and vertically with reference to said pulley, actuating means operatively connected to said lever; supporting means for said pulley shaft slidably adjustable horizontally and vertically with reference to said motor, and stationary means affixed to said supporting means and associated with the motor shaft and clutch hub for taking up the motor bearing thrust transmitted longitudinally through said motor shaft.

3. In a transmission mechanism and mounting therefor, an electric motor, a motor base having thereon a plurality of motor mounting spaces for longitudinal and transverse adjustment of the motor with reference to the base, a switch electrically connected to said motor, a pulley and a shaft therefor, a clutch keyed to the motor shaft and engageable with said pulley, a brake operable upon said pulley; a lever having thereon means to simultaneously actuate said switch, said brake and the pulley shaft assembly for operative engagement with the clutch; an arm having a portion thereof adjustably supported in the motor base, and containing a wall for supporting said switch, and a depending bifurcated arm having a vertical slot therein; the pivot of said lever being slidably movable within said slot and provided with means to hold it fixed in a predetermined position within the slot; and a hanger for said pulley shaft secured to said arm for slidable vertical adjustment.

4. In a transmission mechanism and mounting therefor, a motor base, a motor supported thereby, a switch electrically connected to the motor, a pulley and a shaft therefor, a clutch keyed to the motor shaft and engageable with said pulley, a brake operable upon said pulley; a lever having thereon means to simultaneously actuate said switch, said brake and the pulley shaft assembly for operative engagement with the clutch; a supporting arm having a portion thereof adjustably secured to said motor base, and containing a depending bifurcated portion having a vertical slot therein, the pivot of the said lever being slidably adjustable within said slot; a hanger for supporting said pulley shaft and containing two upwardly extending bifurcated arms vertically adjustable and in detachable engagement with portions of said arm, one of the portions being the said depending bifurcated portion; and means for supporting said motor base at various levels.

5. In a transmission mechanism and mounting therefor, a motor base, a motor supported thereby, a switch electrically connected to the motor, a pulley and a shaft therefor, a clutch keyed to the motor shaft and engageable with said pulley, a brake operable upon said pulley; a lever having thereon means to simultaneously actuate said switch, said brake and the pulley shaft assembly for operative engagement with the clutch; a supporting arm having a portion thereof adjustably secured to said motor base, and containing a depending bifurcated portion having a vertical slot therein, the pivot of the said lever being slidably adjustable within said slot; a hanger for supporting said pulley shaft and containing two upwardly extending bifurcated arms vertically adjustable and in detachable engagement with portions of said supporting arm; a stirrup adjustably affixed to said hanger, and containing a bearing supporting the motor shaft and positioned between the clutch hub and the motor, and a pulley safety guard attached to the stirrup and partially enclosing the pulley and clutch assembly.

6. In a transmission mechanism and mounting therefor, a motor base, a motor adjustably supported thereby, a switch electrically connected to the motor, a pulley and a shaft therefor, a clutch keyed to the motor shaft and engageable with said pulley, a brake operable on said pulley; an abutter member comprising a hollow pin holder, an abutting pin frictionally held therein and means associated therewith for varying the position of the pin within said holder, said pin being operatively abuttable against the adjacent end of said pulley shaft to move it and the attached pulley into operative engagement with the clutch; a lever having its fulcrum slidably adjustable horizontally and vertically with reference to said pulley, one of the arms of said lever carrying said brake, the other arm having attached thereto said abutter member and carrying means to actuate said switch; the said abutter member being vertically adjustable and reversably attachable to the lever arm.

7. In a transmission mechanism and mounting therefor, a motor base, a motor supported thereby, a switch electrically connected to the motor, a pulley and a shaft therefor, a clutch keyed to the motor shaft and engageable with said pulley, a brake operable upon said pulley; a lever having thereon means to simultaneously actuate said switch, said brake and the pulley shaft assembly for operative engagement with the clutch; a supporting arm having a portion thereof adjustably secured to said motor base, and containing a depending bifurcated portion having a vertical slot therein, the pivot of the said lever being slidably adjustable within said slot; a hanger for supporting said pulley shaft and containing two upwardly extending bifurcated arms vertically adjustable and in detachable engagement with portions of said supporting arm; said lever extending between the two walls of one of said upwardly extending bifurcated arms, and containing lateral wings in close juxtaposition to said walls to prevent side play of the lever; and stationary means affixed to said hanger and associated with the motor shaft and clutch hub for taking up the motor thrust.

8. In a transmission mechanism, a clutch and a pulley operatively engageable therewith, said clutch containing a peripheral disc which is joined to the hub by a plurality of arms protruding beyond the plane of said disc, and a demountable clutch facing in juxtaposition to and in facing relation with said disc and having recesses therein to accommodate said arms at their junctures with the disc and in frictional engagement therewith; and actuating means for moving the pulley into operative engagement with the clutch.

9. In a transmission mechanism and mounting therefor, a motor base, a motor supported thereby, a plurality of vertical posts for supporting the machine operated by the transmission mechanism, a plurality of brackets in adjustable and reversable attachment with said motor base and in slidable engagement with certain of said posts for adjustable attachment thereto at predetermined points, a clutch, a pulley operatively engageable therewith, the clutch being directly connected to the motor, supporting means for said pulley adjustably associated with said motor base, a brake for said pulley, a switch electrically connected to said motor; and a lever and means associated therewith for simultaneously actuating said brake, said switch and said pulley to bring it into operative engagement with the clutch.

10. In a transmission mechanism and mounting therefor, a motor base, a motor supported thereby, a plurality of vertical posts for detachably supporting the machine operated by the said mechanism, a pulley and a shaft therefor, a clutch directly connected to the motor and operatively engageable with the pulley, a brake operable on said pulley, an electric switch; a lever having thereon means to simultaneously actuate said switch, said brake and the pulley shaft assembly for operatively engaging the pulley with the clutch, a treadle operatively connected to said lever, a shaft on which the treadle is rotatably mounted and supporting means for said shaft, a hollow lug attached to the treadle and rotatably mounted over the shaft, a hollow treadle stop having an enclosed portion mounted over and affixed to said shaft, and an open portion having two horizontal walls with which the lateral sides of said lug are engageable to limit the angular movement of the treadle.

11. In a transmission mechanism and mounting therefor, a motor base, a motor supported thereby, a switch electrically connected to the motor, a hollow lug on said base, a supporting arm horizontally adjustable and removably secured to said base and slidably movable within said lug, a hanger secured to said arm for vertical adjustment with respect thereto, a pulley and a shaft therefor supported by said hanger, a clutch keyed to the armature shaft of said motor and operatively engageable with said pulley, braking means associated with said pulley, a lever having thereon means to simultaneously operatively engage said braking means and actuate the pulley shaft assembly for engagement with the clutch; the said supporting arm containing a portion having a vertical slot therein, the pivot of said lever being slidably adjustable within said slot; actuating means operatively connected to said lever, and yieldable means in abutment with said arm and operatively engageable wtih said lever to normally keep the lever out of operative engagement with said braking means and said pulley shaft assembly.

SAMUEL M. FRIEDMAN.